US 7,605,353 B2

(12) United States Patent
Greenberg

(10) Patent No.: US 7,605,353 B2
(45) Date of Patent: Oct. 20, 2009

(54) METHOD AND APPARATUS FOR CREATING HIGH-QUALITY DIGITAL IMAGES

(76) Inventor: Gary Greenberg, 520 Washington Blvd. #422, Marina Del Rey, CA (US) 90292

( * ) Notice: Subject to any disclaimer, the term of this patent is extended or adjusted under 35 U.S.C. 154(b) by 17 days.

(21) Appl. No.: 10/860,940

(22) Filed: Jun. 3, 2004

(65) Prior Publication Data

US 2004/0245437 A1    Dec. 9, 2004

Related U.S. Application Data

(60) Provisional application No. 60/476,587, filed on Jun. 5, 2003.

(51) Int. Cl.
*G02B 7/04* (2006.01)
*G01B 9/00* (2006.01)
*G03B 13/00* (2006.01)

(52) U.S. Cl. .................. 250/201.2; 356/124; 348/351

(58) Field of Classification Search ............ 250/216, 250/201.2, 201.8, 201.9; 356/124, 125, 124.5, 356/126; 348/335, 351, 348; 359/16; 382/275
See application file for complete search history.

(56) References Cited

U.S. PATENT DOCUMENTS 5,444,481 A * 8/1995 Ohshima et al. ............ 348/187
6,195,159 B1 * 2/2001 MacDonald et al. ........ 356/123
6,937,282 B1 * 8/2005 Some et al. ................ 348/335

FOREIGN PATENT DOCUMENTS

WO    WO 9926419 A1 * 5/1999

* cited by examiner

*Primary Examiner*—Thanh X Luu
(74) *Attorney, Agent, or Firm*—H. Michael Brucker

(57) ABSTRACT

Methods and apparatus for increasing the quality of digital images produced by systems using uncorrected lenses where in-focus elements in the image space of the lens are detected and recorded as directed by data in a lookup table that specifies where light from addresses in the lens specimen plane come to focus in the lens image space.

17 Claims, 4 Drawing Sheets

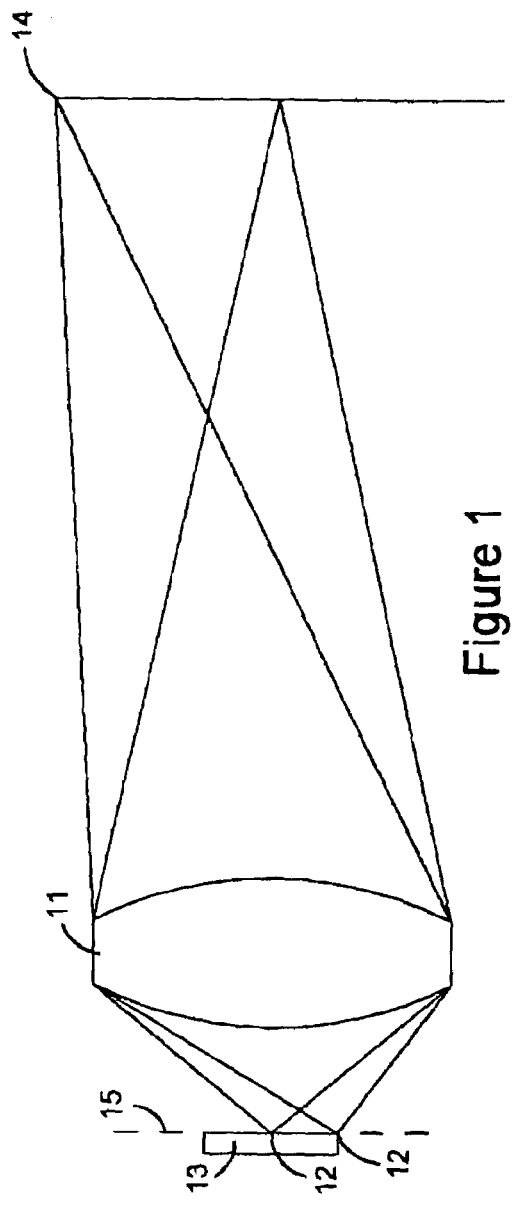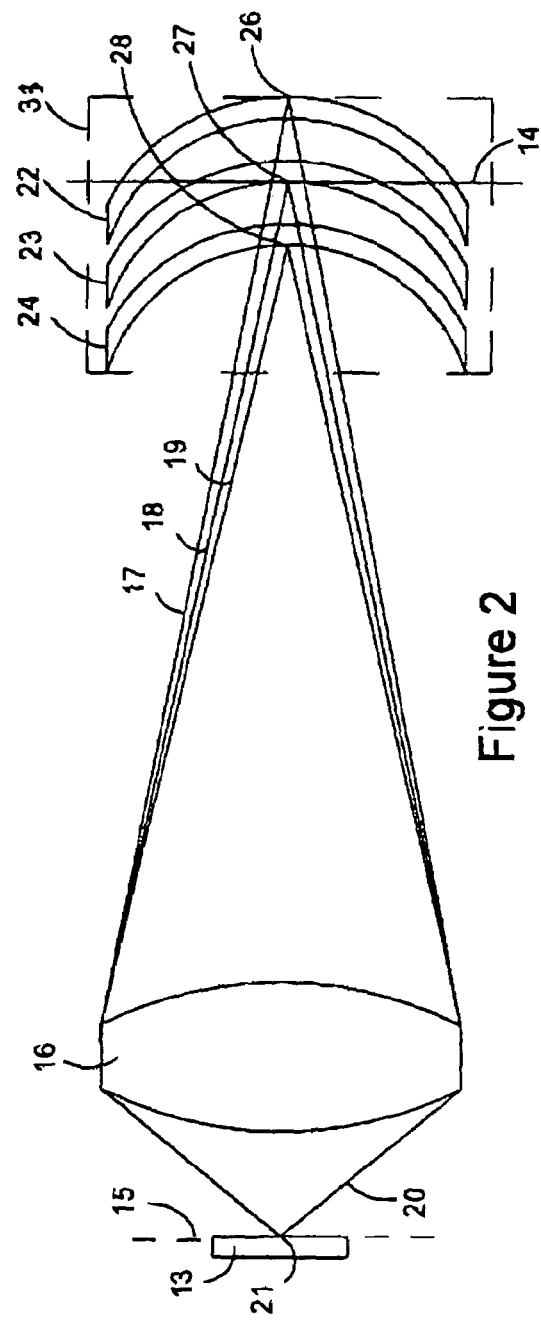

METHOD AND APPARATUS FOR CREATING HIGH-QUALITY DIGITAL IMAGES

FIELD OF INVENTION

The present invention relates to digital image-forming optical systems with lenses and, more particularly, to methods and apparatus for increasing the quality of digital images produced by such systems.

BACKGROUND

As used in this description, the term "lens" refers to an optical device that passes and focuses light and may be a single element (piece of glass) or a plurality of elements (pieces of glass). A "corrected lens" refers to a lens system (multiple elements) which has been constructed to focus every point of light from a specimen onto an image plane (essentially free from spherical and chromatic aberrations). An "uncorrected lens" refers to a lens which, in forming an image of a specimen, focuses some light from the specimen at locations other than the corresponding point at the image plane (has some spherical and chromatic aberrations, or other type of distortion).

The quality of images produced by an optical system with lenses is largely dependent on the quality of the objective lens. One measure of the quality of a lens is the degree to which it is free of spherical and chromatic aberrations. The higher quality the lens, the less distortion introduced in the image formed by the lens. Lens aberrations are naturally-occurring because of the laws of refraction of light, and when lenses bend light at extreme angles, significant aberrations are produced. Good corrected lenses, such as PlanApo objective lenses, for example, are very expensive because they require a large number of precisely manufactured elements to correct for the naturally-occurring aberrations. Very high quality microscope lenses, for example, normally require as many as 10 or 12 different lens elements, each precisely manufactured and assembled, in order to eliminate aberrations and produce distortion-free images.

The universally accepted design desiderata for eliminating spherical and chromatic aberration in lenses is to build a lens that focuses all the rays of light from the specimen plane that pass through it onto a single flat (2D) image plane. It is from this 2D image plane that light values are detected for use in creating a digital image. For lenses to approach this perfection, they must be complex (multiple elements) and precisely manufactured.

Digital imaging technology is becoming the standard for imaging devices such as cameras, microscopes and telescopes. The combination of optics, robotics and computers has revolutionized the way we view the world around us. Image analysis programs and deconvolution software have enabled powerful manipulation of the images, such as removing out-of-focus blur and creating 3-dimensional images from a series of 2-dimensional optical sections.

The present invention teaches novel methods and apparatus for increasing the image quality of an image-forming optical system utilizing uncorrected lenses. By using digital manipulation techniques in connection with detection in a 3D space (and not just a 2D plane), the present invention enables an optical system to produce high-quality images essentially free from distortions, such as spherical and chromatic aberrations, without using corrected lenses.

SUMMARY OF THE INVENTION

The present invention improves the image that would normally be produced by an imaging system using uncorrected lenses by not restricting detection of in-focus light rays to the 2D image plane, but rather by detecting, recording and assembling in-focus light rays in the three-dimensional image space around and including the image plane. This space is defined and referred to herein as the "intermediate image space" or simply the "image space." The methods and apparatus of the present invention significantly reduce the cost of obtaining high-quality images by eliminating the need for expensive corrected lenses.

The outstanding results of the present invention are achieved with an uncorrected lens by first mapping the lens distortions and recording and storing them in a lookup table forming a part of a computer-assisted image-correction device. For a given lens, each address (x-y) at the specimen plane is related to one or more addresses (x-y-z) in the image space where the various points of light from that specimen address come to focus. Thus, for every ray of light that comes from the 2D specimen plane and passes through a (objective) lens, there will be a number of specific locations in the 3D image space where components of that light are in focus. Light from any given specimen plane address can come to focus at the image plane, at a plane before the image plane, and at a plane beyond the image plane. These obvious distortions of the image are in the z axis, but there can also be distortions in the x-y axis that are caused by the lens. With the present invention, when all such planes are within the image space, all of the in-focus light rays can be detected, recorded and used to assemble a high-quality, undistorted image.

The correlated (mapped) addresses between the 2D specimen plane and the 3D image space are recorded into and accessed from a lookup table in a memory device. When the mapped lens is used, a dynamic image-detection device is instructed, using the information in the lookup table, to find each in-focus point of light in the image space. Values for the detected in-focus points of light are recorded and then assembled to construct a 2D output image that portrays the specimen essentially free from distortions.

For each address at the 2D specimen plane, there will typically be three addresses in the 3D image space that must be detected and recorded: one for each of the colors red, green and blue, since each color may be differently affected by the imperfections of the lens. Thus, in digitally assembling a 2D image, a number of data points will be used to create the combined light value to be ascribed to any given image address.

When an image is formed by an uncorrected lens, the points of light from the specimen will come to focus at different planes within the image space. In prior art systems that look only at the image plane for light values to construct an image of the specimen, the points of light focused at planes other than the image plane introduce distortions. In the present invention, even the focused points of light in the image space not at the image plane are detected and used to construct the image.

It is an object of the present invention to provide methods and apparatus by which digital imaging systems using uncorrected lenses can produce high-quality digital images.

It is another object of the present invention to create high-quality digital images of a specimen using an uncorrected lens by use of a distortion map of the lens that correlates the location of in-focus light rays in a 3D image space to the location in a 2D specimen plane from which the light emanates.

Yet another object of the invention is to provide a light detector that scans a 3D image space and records only the light values at addresses where light is in focus.

Still another object of the invention is to provide a system in which a lookup table instructs a light detection device where to look for and record light values in a 3D space.

Another object of the present invention is to provide a method by which light values in a 3D space are detected, recorded and assembled according to a predetermined map to create a high-quality digital image.

A further object of the present invention is to create lookup tables for uncorrected lenses which list the locations in an image space where light from a specimen plane that passes through a lens comes to focus.

Other advantages and objects of the invention will be apparent to those skilled in the art from the description of the invention which follows with reference to the following drawings.

BRIEF DESCRIPTION OF THE DRAWINGS

FIG. 1: A schematic illustration of the ray path of a theoretically perfect lens;

FIG. 2: A schematic illustration of the ray path of an imperfect lens;

DETAILED DESCRIPTION OF THE INVENTION

Figure 3:
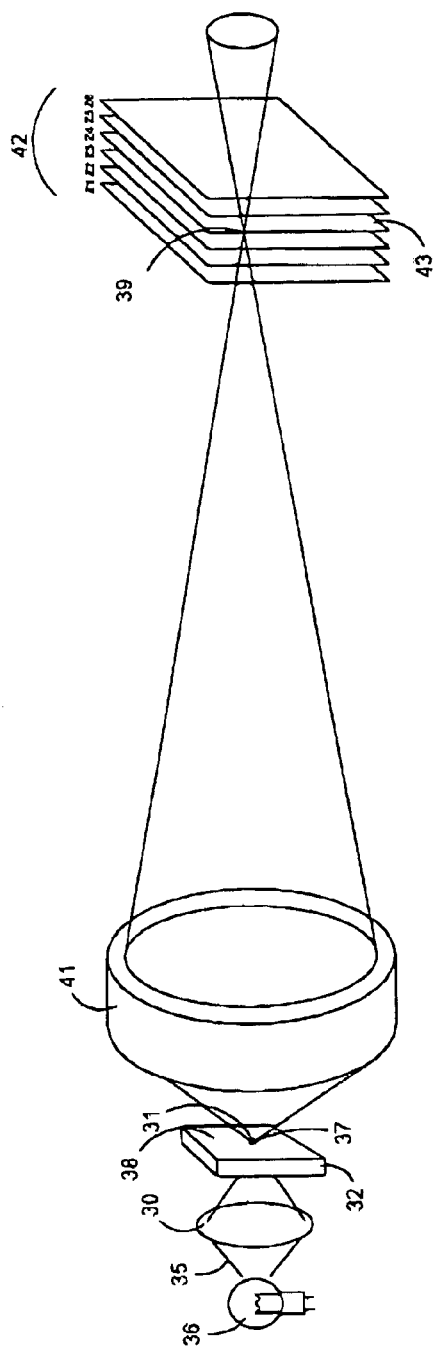
FIG. 3: A schematic illustration of the ray path of an imperfect lens in relation to the image space of a lens.

The goal of a digital camera or digital microscope is to faithfully reproduce the image of a specimen (object) on a digital display device such as a monitor, printer, screen, etc. One limitation in fully achieving this goal is the tendency of lenses to produce aberrations that distort the image. The two most prominent distortions caused by lenses are spherical aberration and chromatic aberration. Spherical aberration occurs because lenses are curved so the central rays of light are not bent to the same degree as the more marginal rays, which results in differences of focus between central rays and more marginal rays. The obvious result is an image that is curved, not flat and not sharp across the field of view. Chromatic aberration occurs because different colors of light are bent differently by the curvature of the lens, similar to the way a prism spreads out the colors in white light. As a result, different colors of light come to focus at different planes around the lenses intermediate image plane.

One of the key components of the present invention is a light sensor, such as a CCD chip or a CMOS chip, which is widely used in a variety of digital imaging devices. These chips have an array of addressable light-sensing elements, each of which can detect and measure light values and provide an output signal. As used herein, a "pixel" refers to one or more such sensing elements which operate as a unit. Thus, a single pixel (one or more light sensing elements) can be addressed as a single unit and can provide a single output signal. The number of pixels in a given sensor chip will depend on the resolution of the chip and how the elements are grouped together (or not).

If a lens is perfect (corrected), then the intensity and color of light from position A1 on a specimen will be reliably reproduced at pixel address A1 on the imaging device. This can be nearly achieved, but only by employing very expensive lenses that are corrected for three colors and reproduce a flat image of the specimen. However, for less expensive lenses, a 2D slice of the specimen is not reliably reproduced as a corresponding 2D slice at the image plane of the lens. In other words, the lens will distort the image at the image plane.

Referring to FIG. 1, a corrected lens 11 (illustrated schematically as a single element when, in reality, it would be multiple elements) focuses the light 12 from every point of a specimen 13 at a specimen plane 15 onto a flat image plane 14. The light 12 includes red, green and blue components (not shown separately) which are all focused onto the image plane 14. Thus, the corrected lens 11, having no spherical or chromatic aberrations, causes little to no distortions in the image of the specimen 13 at image plane 14. Each point of light 12 (including each of its color components) is focused by corrected lens 11 onto the flat image plane 14 where light values can be detected and used to construct a faithful digital image of the specimen 13.

Referring to FIG. 2, an uncorrected lens 16 (having chromatic and spherical aberration, and other distortions) focuses the red, green and blue components 17, 18 and 19, respectively, of the light 20 from a point of light 21 of specimen 13 at specimen plane 15 onto three curved planes 22, 23 and 24, respectively, each at a different distance from the uncorrected lens 16. The red component 17, for example, is focused on a curved plane 22 at a point 26 beyond the image plane 14; the green component 18 is focused on a curved plane 23 at a point 27 at the image plane 14; and the blue component 19 is focused on a curved plane 24 at a point 28 before the image plane 14. If only the light values at image plane 14 are used to create an output light value for the specimen point of light 21, a distorted value will result because, at image plane 14, the red and green components are out of focus. The present invention, as will be explained below, detects the in-focus values for all of the color components 17, 18 and 19, even if they are not all at the image plane 14. The in-focus values of these components are then combined to construct an image of the same quality as if all of the components of point of light 21 had come to focus at the image plane 14.

As used herein, the term "image space" refers to that 3D space which surrounds and includes the image plane 14 where the light components, such as from specimen point of light 21, come to focus. In FIG. 2, image space 33 includes the locations where all three of the components 17, 18 and 19 of the light 20 from specimen point of light 21 come to focus. The same is true for the other points of light from specimen 13.

In order to locate and measure the light values at only the points of focus, such as points 26, 27 and 28 in the image space 33, it must be known in advance where in the image space 33 these in-focus points will occur for the lens being used. Thus, an important part of the present invention is a lookup table (map) that identifies where in the image space 31 for the particular uncorrected lens 16 each color component of any point of light from the specimen plane 15 will come to focus. This lookup table can be created in three ways: it can be constructed empirically; it can be created mathematically; and it can be constructed using a combination of both. When the empirical method is used (either alone or with the mathematical method), a sensor is used to map the image space to create the lookup table.

In the preferred embodiment, the sensor has the same number of sensor pixels as the number of assigned specimen addresses. However, this 1:1 relationship is not a requirement. It is a trade-off between speed and resolution. If there are fewer sensor pixels than the addresses at the specimen plane, then the system will work faster, but the resolution will suffer. On the other hand, if there are more sensor pixels than specimen addresses, then over-sampling will occur, which will slow the system without increasing resolution.

In one embodiment, there are more specimen addresses than there are pixels on the imaging sensor. Existing computer software and hardware can control the imaging sensor and enable resolution enhancement by slightly shifting the imaging sensor in the x-y plane, and then employing computer algorithms, such as "next neighbor," to increase the output resolution beyond the number of pixels on the imaging sensor. This technology is commonly used in consumer digital cameras currently on the market.

Mapping Lens Characteristics Mathematically: Current off-the-shelf lens design software programs, such as "Code V," can map the place that each point in the image will come to focus for virtually any lens design. A particular lens design is entered into the program, and it plots each and every ray path that emanates from the specimen plane in the field of view, and shows exactly where they come to focus at the intermediate image space, and it does it for red, green and blue light rays. This information can be written into a lookup table, such as in a ROM device, that makes the information available quickly when subsequently used to construct an image.

Mapping Lens Characteristics Empirically: Not all lenses that are manufactured to a particular specification are identical. Manufacturing tolerances determine how faithfully reproduced each lens will be in reality. Thus, the degree of faithfulness of the output image will depend on the lens manufacturing tolerances, as well as the physical alignment of the lens in the instrument, relative to the imaging sensor.

A more precise method for mapping lens distortions is to empirically test every address at the specimen plane. This method includes a calibration device that empirically maps the defects in the lens. The basic calibration device consists of a pinhole of light that is moved across the specimen plane in a raster fashion, one address at a time. At each address, the locations in the image space where the color components of the light come to focus are located and recorded. The present invention teaches a system for such empirical mapping.

Referring to FIG. 3, light 35 from a light source 36 is focused by a lens 30 onto a pinhole 31 in an opaque sheet 32 to create a point of light 37 at a specimen plane 38. As explained above, the point of light 37 will have multiple components; however, it is only necessary to illustrate one for this example. The point of light 37, which passed through and is focused by a lens 41, comes to focus somewhere in the intermediate image space 42, which includes an intermediate image plane 43. If the lens is free of distortions, the point of light 37 will come to focus at the image plane 43. Distortions in the lens 41, however, can cause the point of light 37 to come to focus at a location in the image space 42 other than at image plane 43.

Point of light 37 has a specimen address (x-y) in the specimen plane 38 and the goal is to determine a light value to use at a corresponding image address (x-y) at an image display device (not shown). To do this accurately, it is necessary to measure the light value of every component of point of light 37 where they come to focus in the image space 42.

Figure 3A:
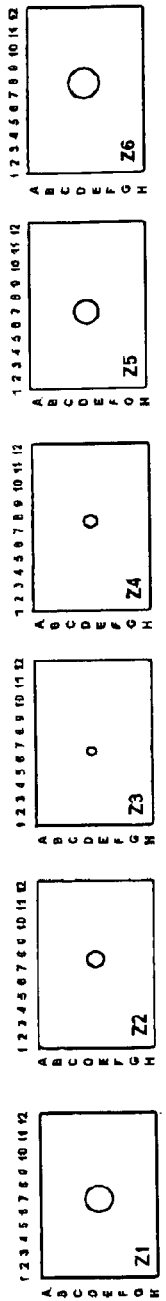
FIG. 3A: An illustration of a plurality of planes in the image space of FIG. 3.

Referring also to FIG. 3A, the image space 42 is subdivided into six planes (parallel to and including the image plane 43) identified as Z1, Z2, Z3, Z4, Z5 and Z6. It will be understood by those skilled in the art that the image space 42 can be subdivided into more or less planes parallel to the image plane 43 and that the six illustrated is not a limitation, but only an example for purposes of explanation. Locations within any of these planes Z1-Z6 can be identified by an "x" coordinate (scale 1-12) and a "y" coordinate scale (A-H). Once again, the number of subdivisions in the coordinates is by way of example and not a limitation of the invention. With the image space 42 so divided, the precise location of where the image of point of light 37 comes to focus can be expressed as an x-y-z coordinate. It will occur to those skilled in the art that other coordinate systems could be used without departing from the invention. To find the best value for point of light 37, each plane Z1-Z6 is examined to find the smallest and brightest image of the point of light 37. For the illustrative example, this occurs at plane Z3, at horizontal (x) location 7, and vertical (y) location E. Thus, the light value of this component of point of light 37 to be used to construct an image is measured at 7, E, Z3.

By locating the address in image space 42 where the light from every specimen address and every color component of the light from that address comes to focus, a lookup table can be assembled that identifies those locations within image space 42 where in-focus light can be found for lens 41. The lookup table can then be used with the specific lens 41 to instruct an imaging device of the present invention (described below) where to find the in-focus red, green and blue light values to be used to construct an output image. The present invention uses a calibration device to create lookup table data.

Figure 4:
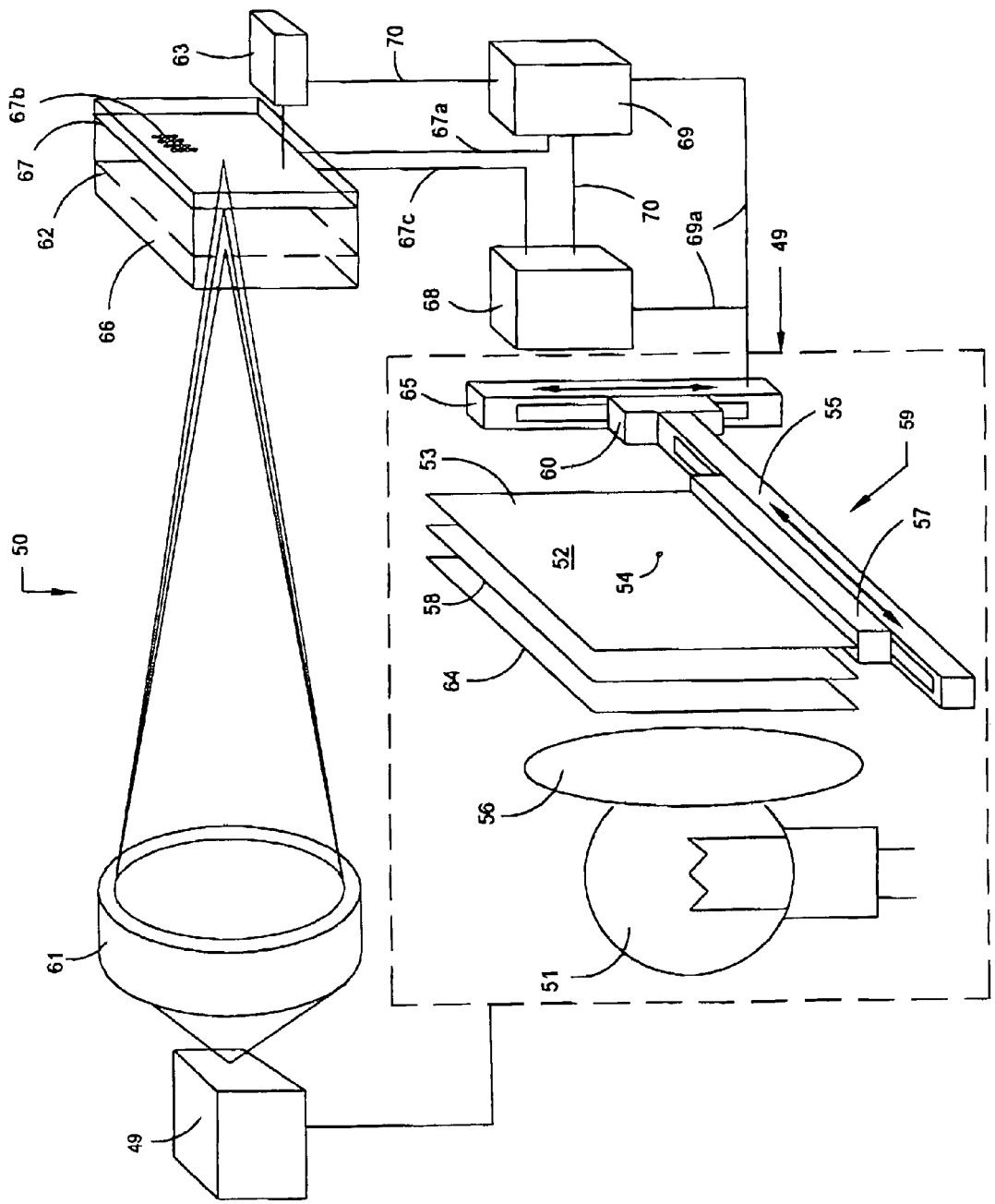
FIG. 4: A schematic illustration of a calibration (mapping) system for creating a lookup table with a portion enlarged for ease of view.

Referring to FIG. 4, a calibration device 50 for creating a lookup table for a lens 61 includes an illumination system 49 (shown in detail within dashed box). A condenser lens 56 focuses light from a light source 51 onto a diffuser 64 which illuminates a pinhole 54 in a thin, black, opaque sheet 53 at the specimen plane 52. The diffuser assures that the light intensity at pinhole 54 is the same for all positions of pinhole 54 in the specimen plane.

The light from pinhole 54 is directed to lens 61 which projects an image of the pinhole 54 on to the image space 66 that surrounds the image plane 62 of lens 61. Alternatively, laser light could be employed instead of a backlit pinhole. The laser beam would be steered to each specimen address using conventional electromagnetic mirror controllers, which are known in the art for aiming laser beams.

A color filter 58 is placed between the light source 51 and the pinhole 54 to selectively produce a red, green or blue test light.

The pinhole 54 (opaque sheet 53) can be positioned to any selected location in specimen plane 52 by a nanopositioning device 59 that is directed by a signal 69a from a control unit 69. More specifically, opaque sheet 53 is secured in a slide 57 that is movable in the horizontal direction along a horizontal mount guide 55. The guide 55 is attached to a vertical slide 60 that moves up and down along vertical mount guide 65. The coordinated movement of slide 57 and slide 60 permits pinhole 54 to be located at selected x-y address in the specimen plane 52. Thus, pinhole 54 is movable in the x and y directions in the specimen plane 52 by nanopositioning device 59 to a plurality of different addresses in the specimen plane 52. For each such address, an image of the pinhole 54 comes to focus in the intermediate image space 66. The calibration device 50 locates where the image of the pinhole comes to focus and records the location, along with the associated specimen plane address of the pinhole 54.

A light sensor 67, such as a CCD chip or CMOS chip, has a surface of light sensors 67b (pixels). Sensor 67 is generally parallel to the specimen plane 52 and precisely movable in the z dimension (perpendicular to the image plane 62) throughout image space 66 by a driver 63 in response to a signal 70 from control unit 69. Devices such as driver 63 for precisely moving a light sensor such as sensor 67 using piezo electric crystals or other nanopositioning means are well known in the art and therefore require no detailed explanation. Alternatively, the pinhole 54 (specimen plane) or lens 61 can be moved (focused) in the z direction with the sensor 67 held stationary.

When either the pinhole 54 or lens 61 is moved in the z direction with the sensor 67 remaining stationary, the image space 66 moves in the z direction relative to sensor 67 and the in-focus points of light in various locations within the image space 66 can be detected and measured by sensor 67. It is the relative movement between the sensor 67 and image space 66 that permits the invention to have access to otherwise inaccessible in-focus points of light.

For each location of the pinhole 54 and for each of the colors red, green and blue at such location, the sensor 67 scans the image space 66 in response to a drive signal 70 from control unit 69. As the sensor 67 scans the image space 66, a signal 67a is directed from the sensor to the control unit 69. The signal 67a is analyzed by control unit 69 to locate the in-focus image. The sensors 67b provide a signal 67c that identifies their x-y position. When the in-focus image is detected, the location signals 69a (x-y pinhole position), 70 (z image position) and 67c (x-y image position) are sent to and recorded in recording device 68. The recording device 68 can be any of the many types of memory devices, ROM or the like, presently available on the open market that store digital information.

As described above with reference to FIGS. 3 and 3A, for each x-y location of pinhole 54, and for each color component of the light at that x-y location, the sensor 67 is moved through image space 66 looking for the location where the image of the pinhole 54 is in focus. When those locations are found, they are recorded in the recording device 68, along with the position of the pinhole 54.

In this way, a lookup table is created (see FIG. 5) that contains three locations in image space 66 (one for each color component) for each location at which pinhole 54 is placed in specimen plane 52. Each of these image space locations is where one color component of the image of the pinhole 54 is in focus.

An example of a calibration procedure begins by illuminating a single pinhole at an address at the specimen plane, such as address A1, first using red light. The light sensor 67 is then moved in the z axis throughout the image space 66. As the sensor 67 samples the image space 66, the address in image space 66 that produces the strongest and sharpest image is recorded in recording device 68 as the intermediate image address for specimen address A1 for red light.

This procedure is repeated for multiple addresses at the specimen plane for all three colors. The completed mapping results in data in a lookup table having three entries (red, blue and green) for each selected specimen plane address.

The calibration device 50 is mainly used during installation and alignment of the system and is not used in the process of creating corrected digital images. Alternatively, the specimen pinhole sheet 53, the calibration system and the program to write and record lookup tables can be included in the overall system so that users can create profiles for a number of different lenses.

In addition to the empirical method of creating the lookup table, as described above, a lookup table can also be created mathematically. The location where the light from each pinhole address at a specimen plane will come to focus can be predicted mathematically using a ray-tracing computer program, such as those which are popularly used in the field of lens design. However, the exact focus locations will depend on the manufacturing tolerances of the lens, as well as the alignment of the lens. Because the described empirical method of finding where each pinhole of light comes to focus is potentially time-consuming, there is an advantage to combining the mathematical and empirical methods. Because the locations predicted by the mathematical approach will be off only by the manufacturing tolerances (assuming proper alignment), it is possible to know in advance approximately where the in-focus points should be and to look in those locations. If the in-focus locations are not where predicted, they will be very close by. Relying on this premise, multiple pinholes at relatively large spacing can be projected and detected simultaneously without image overlap that would introduce error. This combined method can speed up calibration by one or more orders of magnitude.

Once a lens is calibrated and the focus location data are placed in a lookup table, the lens must not be rotated or changed from its test position. Thus, to use interchangeable lenses, each lens should have a calibration pin to ensure that it is replaced into the instrument in the same position and angular orientation at which it was calibrated.

In addition to the focus locations, an intensity map of the lens can be added to the lookup table to correct for distortions in image brightness at each address. A common problem with many lenses is that they produce images that are brighter in the middle and darker around the edges. This problem is easily corrected by adding a value in the lookup table for each output address that corrects for intensity so that a flat, even field of light at the specimen plane will produce an image with a correspondingly flat and evenly lighted field.

When the calibration process is being carried out, the intensity of light from the pinhole 54 will be constant at all specimen addresses, as assured by the diffuser 64. When the in-focus image of the pinhole 54 is located as described above, the intensity of the image can be measured by the sensor 67 and included in the signal 67a. By selecting the intensity of an image of the pinhole 54 at a specimen address between the center and the edge of the lens 61 to be the reference level, then the intensity of all other images for other addresses can be compared as either the same, weaker or stronger. In this way, the lookup table can contain the additional data of how much the intensity of the image at each location where the pinhole is in focus needs to be corrected, if at all.

Once the lookup table is created for a particular lens, that lens can be used in an imaging system of the present invention to produce images equivalent to those produced by corrected lenses.

Figure 5:
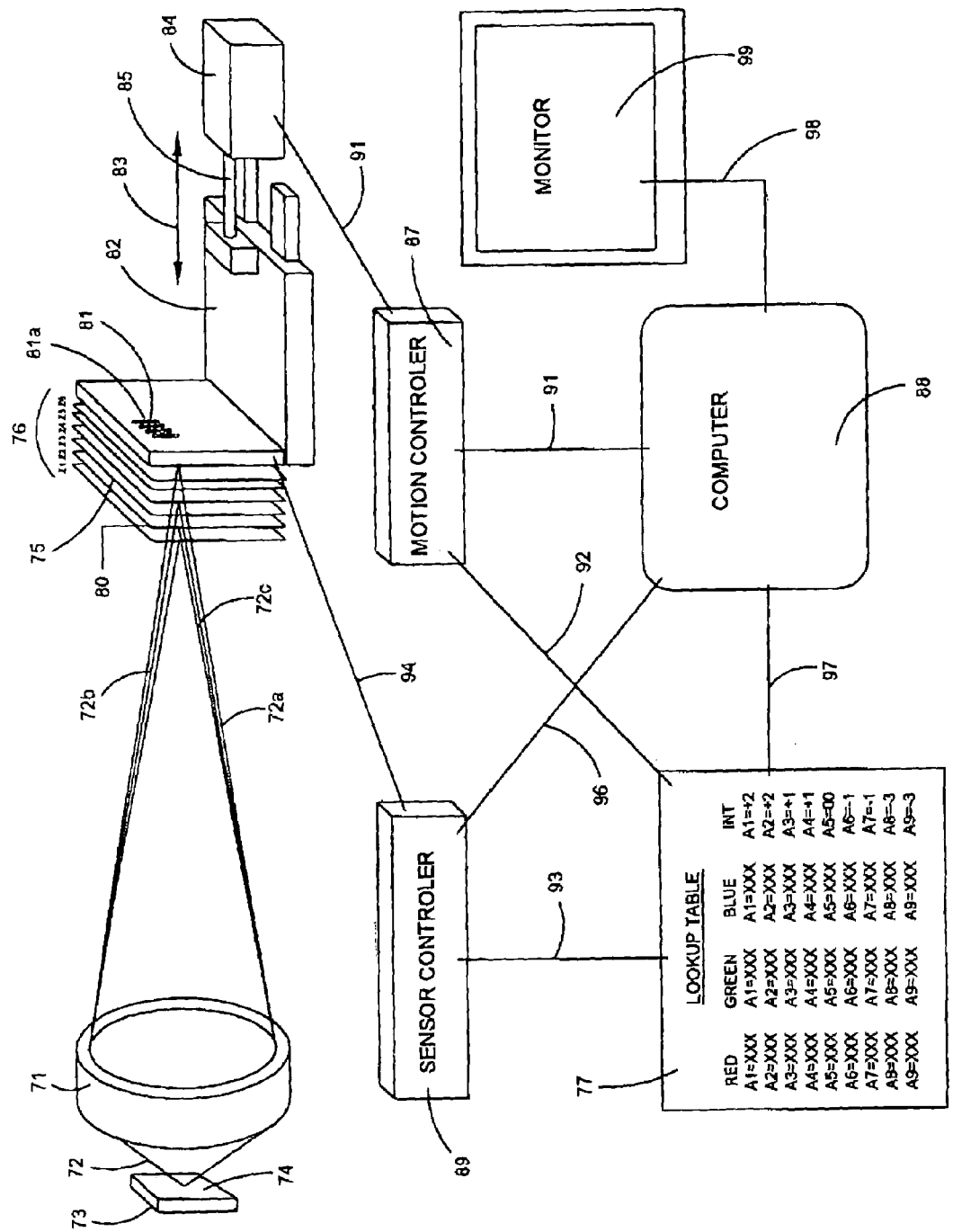
FIG. 5: A schematic illustration of an optical digital imaging system according to the invention.

Referring to FIG. 5, in general, to create an image of a specimen 73 located at the specimen plane 74 of a lens 71, the lens 71 is first focused on the specimen 73 to get the best possible image at the image plane 75. Then, the system of the invention is operated to digitally correct the image for the selected focus and field of view.

A light sensor 81 focuses (moves) along the z axis 83 (this could also be achieved by focusing the lens or the specimen stage) while being instructed to collect light values only at those locations specified in the lookup table 77. The light values so collected are stored in a computer 88 and used to construct a corrected output image at a monitor 99.

The information stored in the lookup table 77 represents the unique characteristics of how lens 71 distorts an image. This information is stored, such as in a resident ROM chip, so that when the same lens 71 is subsequently used, an undistorted image can be produced by sampling the light at multiple levels within the image space 76 using the lookup table 77 to guide the light sensor 81 to the best values for each component of light from each output address of the specimen 73. By using the lookup table selected values, an undistorted, flat image of the specimen 73 is achieved.

Still referring to FIG. 5, the lens 71 focuses light 72 from a specimen 73 at a specimen plane 74 into the intermediate image space 76. The light 72 has three color components, 72a, 72b and 72c, which, for this example, all come to focus at different z locations within image space 76.

As described above with reference to the calibration (mapping) process and FIG. 4, the intermediate image space 76 is subdivided into a plurality of addresses, each having an x-y-z coordinate. The x-y coordinates address a unique location in one of the z planes 80 parallel to the image plane 75.

A lookup table 77 contains the addresses where all of the components of light from locations in the specimen plane 74 come to focus in the image space 76 for lens 71.

A light sensor 81 (imaging chip) is mounted on a sled 82 which is positionable in both directions along the z axis 83 by a pushrod 85 of a positioning device 84. Positioning devices for moving objects in nanometer increments with great precision are well known in the art and it is well within those skilled in the art to provide electromechanical means for positioning light sensor 81 at precise locations along the z axis 83 within the image space 76.

A motion controller 87 directs the sled 82 and affixed light sensor 81 along the z axis 83 to the z locations specified in lookup table 77. Motion controller 87, which can be part of a computer 88, provides a z position signal 91 to positioning device 84 which causes it to move sled 82 to a specified locations along the z axis in the intermediate image space 76. The particular locations in the image space 76 where the sled 82 and sensor 81 are driven is determined by a lookup table signal 92 from the lookup table 77. The signal from lookup table 77 that directs motion controller 87 and positioning device 84 can come directly from lookup table 77 via link 92, or by way of computer 88 via links 97 and 91.

When the light sensor 81 is at a lookup table specified z location, it senses and transmits the light values from only those x-y locations specified in lookup table 77, which are the locations where light 72 from various locations on specimen 73 comes to focus.

A sensor controller 89 permits only those elements (pixels) 81a of light sensor 81 that are at the x-y locations that lookup table 77 specifies via link 93 as containing in-focus light to transmit value data to computer 88. In this way, only the in-focus light at each z location is used to create an image. The light value data detected by sensor 81 at the lookup table specified locations is sent to computer 88 for storage, either directly (not shown) or via links 94 and 96. Once the light sensor 81 scans the entire image space 76, all of the addresses in lookup table 77 will have been detected and their light value data transmitted to and stored in computer 88. The stored light values in computer 88 are used to create a corrected output image and are sent to display device 99 (monitor) via link 98 for viewing. In this way, an image of the specimen 73 can be digitally constructed and displayed on image display device 99. Because only the values of in-focus light are used, the image is virtually distortion-free.

The sensor 81a requires a certain exposure time in order to properly collect light values. As the light sensor 81 moves along the z axis, it can dwell at a set of z axis locations to collect the light at lookup table specified addresses at each of these z locations. If data from only a few z levels are collected, then the resolution of the output image will suffer. If data from too many z levels are collected, then the speed of the system will suffer because the data will be over-sampled.

Figure 6:
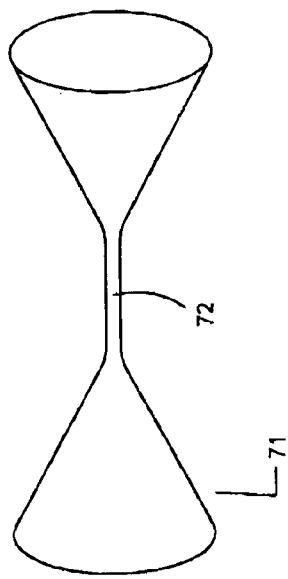
FIG. 6: An illustration of the shape of a beam of light where it comes to focus.

Alternatively, the light sensor 81 can move continuously through the image space 76, rather than dwelling at certain z locations. Because the point spread function of a lens 71 focuses each point of light from specimen 73 to an elongated shaft of light 78, as shown in FIG. 6, the light sensor 81 can move continuously and gather enough light while traveling along a shaft of light 78 to collect a useful reading. The lookup table 77 instructs the sensor controller 89 when to turn on elements 81a of sensor 81 to begin collecting an exposure for a particular address and when to end the exposure for that address. This method maximizes the resolution, speed and brightness.

The present invention teaches that the intermediate image plane or film plane of an optical/digital imaging system, such as a camera or a microscope, can be advantageously expanded into a three-dimensional image space. Current lens design is based on building optical systems that produce images that come to focus on flat, static film planes. The present invention teaches methods and apparatus for extending the traditional intermediate image plane into a three-dimensional image space by having the digital imaging sensor move to various positions in the three-dimensional image space to capture in-focus points of light at, as well as off, the image plane.

The functions specified for the several elements of the invention shown schematically as boxes or squares (recorder 68, controller 69, nanopositioner 59, z driver 63, sensor controller 89, motion controller 87, and lookup table 77) are computer program driven. The programs for performing the functions of these elements either exist or are well within the skill of the art to write.

One skilled in the art of optics can apply the teachings of the invention to manufacture higher-quality optical systems that are simpler and less expensive than conventional fixed-image-plane optical systems.

Zoom lenses and wide-angle lenses, like microscope lenses, suffer from inherent optical distortions that are very difficult and expensive to correct. Zoom lenses not only exhibit the standard sorts of aberration, but, in addition, they are required to change focal length and magnification while still focusing a sharp image onto a static, flat image plane. By allowing the lens to focus at different places within the image space, rather than at only a flat, fixed image plane, the design and manufacturing of zoom lenses becomes significantly less complex. In fact, this new technology will improve the quality of zoom lenses, which have always suffered from aberrations in perspective that cause straight lines to appear curved.

Obviously, many modifications and variations of the present invention are possible in light of the above teachings. It will, therefore, be understood by those skilled in the art that within the scope of the appended claims, the invention may be practiced otherwise than as specifically described.

What is claimed is:

1. A method of creating a digital image of a specimen at a specimen plane using an uncorrected lens, which lens has an image space which includes an image plane, and which lens focuses light from the specimen plane at different locations in the image space, including at the image plane and planes other than the image plane, comprising:

moving a light sensor through the image space; and sensing with the light sensor light from the specimen wherever it comes to focus in the image space, including at planes other than the image plane;

ascribing values to the sensed light; and creating a digital image of the specimen from the ascribed values, wherein the image so formed is corrected for aberrations in the uncorrected lens.

2. The method of claim 1 where the light sensor is moved to and dwells at different locations in the image space.

3. The method of claim 1 where the light sensor moves continuously through the image space.

4. The method of claim 1 wherein said sensing step comprises directing the light sensor to different locations in the image space, as specified by data in a lookup table.

5. A method of creating a digital image of a specimen at a specimen plane using an uncorrected lens, which lens has an image space which includes an image plane, and which lens focuses light from the specimen at different locations in the image space, including at the image plane and planes other than the image plane, comprising:

sensing light from the specimen where it comes to focus in the image space, including at planes other than the image plane;

ascribing values to the sensed light; and storing the ascribed values, wherein the locations in the image space where light is sensed are specified in a lookup table wherein the lookup table stores location addresses in the specimen plane and, for each such address, stores a plurality of location addresses in the image space.

6. The method of claim 5 where the lookup table includes an intensity correction factor for each stored specimen plane location address.

7. The method of claim 5 further comprising:

creating a digital image of the specimen from the ascribed values, wherein the image so formed is corrected for aberrations in the uncorrected lens.

8. A method of creating a digital image of a specimen at a specimen plane using an uncorrected lens, which lens has an image space which includes an image plane, and which lens focuses light from the specimen plane at different locations in the image space, including at planes other than the image plane, comprising:

moving a light sensor through the image space; and sensing with the light sensor light from the specimen where it comes to focus in the image space, including at planes other than the image plane;

wherein said sensing step comprises directing the light sensor to different locations in the image space, as specified by data in a lookup table, wherein the light sensor has an array of data transmitting addressable sensing pixels that are selected for data transmission, and the data in the lookup table includes addresses of specific sensing pixels.

9. The method of claim 8 further comprising;

selecting specified pixels to transmit data as required to select and record light values from specific locations in the image space.

10. A method of creating a digital image of a specimen at a specimen plane using an uncorrected lens, which lens has an image space which includes an image plane, and which lens focuses light from the specimen at different locations in the image space, including at the image plane and planes other than the image plane, comprising:

sensing light from the specimen where it comes to focus in the image space, including at planes other than the image plane;

ascribing one or more values to the sensed light; and storing the ascribed values, wherein the locations in the image space where light is sensed are specified in a lookup table wherein the lookup table stores location addresses in the specimen plane and, for each such address, stores one or more location addresses in the image space.

11. The method of claim 10 further comprising:

creating a digital image of the specimen from the ascribed values, wherein the image so formed is corrected for aberrations in the uncorrected lens.

12. A system for creating a digital image of a specimen at a specimen plane using an uncorrected lens, which lens has an image space which includes an image plane, and which lens focuses light from the specimen plane at different locations in the image space, including at planes other than the image plane, comprising:

a light sensor movable in the image space and having an array of data transmitting addressable sensing pixels for sensing the light from the specimen where it comes to focus in the image space, including at planes other than the image plane;

a data lookup table containing location addresses in the image space where said light sensor is to sense the light from the specimen;

a sensor driver that moves said sensor to various locations in the image space; and a sensor controller that specifies for any given location specified in said lookup table which pixels transmit data.

13. The system of claim 12 wherein said sensor driver moves said light sensor to lookup table specified.

14. The system of claim 13 wherein said light sensor driver moves said light sensor to and dwells at lookup table specified locations.

15. The system of claim 13 wherein said light sensor driver moves said light sensor continuously through the image space, including the lookup table specified locations.

16. The system of claim 12 wherein said sensor ascribes one or more values to such sensed light; and further comprising:

a computer having access to said lookup table and disposed to receive the ascribed values of the sensed light and create a digital image of the specimen from said ascribed values.

17. The system of claim 16 wherein one of the ascribed values is intensity.

* * * * *

UNITED STATES PATENT AND TRADEMARK OFFICE
CERTIFICATE OF CORRECTION

PATENT NO.         : 7,605,353 B2                                                Page 1 of 1
APPLICATION NO. : 10/860940
DATED              : October 20, 2009
INVENTOR(S)        : Gary Greenberg It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 618 days.

Signed and Sealed this

Fifth Day of October, 2010

David J. Kappos
*Director of the United States Patent and Trademark Office*